US012739818B2

(12) United States Patent
Li

(10) Patent No.: US 12,739,818 B2
(45) Date of Patent: Sep. 15, 2026

(54) GROUP-SCHEDULING INSTRUCTION PROCESSING METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 351 days.

(21) Appl. No.: 18/577,726

(22) PCT Filed: Jul. 9, 2021

(86) PCT No.: PCT/CN2021/105565

§ 371 (c)(1),
(2) Date: Jan. 9, 2024

(87) PCT Pub. No.: WO2023/279389

PCT Pub. Date: Jan. 12, 2023

(65) Prior Publication Data

US 2024/0323948 A1 Sep. 26, 2024

(51) Int. Cl.
*H04W 72/121* (2023.01)
*H04W 72/232* (2023.01)

(52) U.S. Cl.
CPC ....... *H04W 72/121* (2013.01); *H04W 72/232* (2023.01)

(58) Field of Classification Search
CPC .......................... H04W 72/121; H04W 72/232
See application file for complete search history.

(56) References Cited

U.S. PATENT DOCUMENTS

| | | | |
|---|---|---|---|
| 9,155,112 B2 | 10/2015 | Li | |
| 10,595,326 B2 | 3/2020 | Liao et al. | |
| 11,259,315 B2 | 2/2022 | Li et al. | |
| 2013/0045769 A1 | 2/2013 | Li | |
| 2018/0092070 A1 | 3/2018 | Pei-Kai et al. | |
| 2018/0124753 A1* | 5/2018 | Sun | H04L 1/0079 |
| 2019/0116490 A1* | 4/2019 | Chang | H04W 72/1268 |
| 2019/0261386 A1 | 8/2019 | Li et al. | |
| 2020/0187237 A1* | 6/2020 | Su | H04L 1/1896 |

(Continued)

FOREIGN PATENT DOCUMENTS

| | | |
|---|---|---|
| CN | 101815255 A | 8/2010 |
| CN | 102333381 A | 1/2012 |
| CN | 103687034 A | 3/2014 |

(Continued)

OTHER PUBLICATIONS

Extended European Search Report Issued in Application No. 21948883.0 dated Jul. 9, 2024, 8 pages.

(Continued)

*Primary Examiner* — Won Tae C Kim
(74) *Attorney, Agent, or Firm* — Finnegan, Henderson, Farabow, Garrett & Dunner, L.L.P.

(57) ABSTRACT

A method for processing a group-scheduling instruction is performed by a network device, and includes: sending a group-scheduling instruction for a UE group, wherein the UE group includes one or more UEs.

14 Claims, 6 Drawing Sheets

UE

Network device

At S110, send a group-scheduling instruction for a UE group, where the UE group includes one or more UEs

(56) References Cited

U.S. PATENT DOCUMENTS

2021/0144676 A1 5/2021 Lilei et al.

FOREIGN PATENT DOCUMENTS

| | | | |
|---|---|---|---|
| CN | 104066194 | A | 9/2014 |
| CN | 109479266 | A | 3/2019 |
| CN | 111373826 | A | 7/2020 |
| KR | 20200027048 | A | 3/2020 |
| WO | WO 2018/085429 | A1 | 11/2018 |

OTHER PUBLICATIONS

ISA State Intellectual Property Office of the People's Republic of China, Written Opinion of the International Searching Authority Issued in Application No. PCT/CN2021/105565, Mar. 00, 2022, WIPO, 8 pages.

ISA State Intellectual Property Office of the People's Republic of China, International Search Report issued in Application No. PCT/CN2021/105565, Mar. 31, 2022, WIPO, 5 pages.

3GPP TS 36.331 V17.6.0,3GPP TS E-UTRA RRC Release, Sep. 17, 2023.

State Intellectual Property Office of the People's Republic of China, The First Office Action and Search Report issued in Application No. 202180002110X , Jul. 27, 2023, 9 pages.

Office Action issued by the Intellectual Property India on Apr. 6, 2026, in corresponding Application No. IN 202417007568, 9 pages.

* cited by examiner

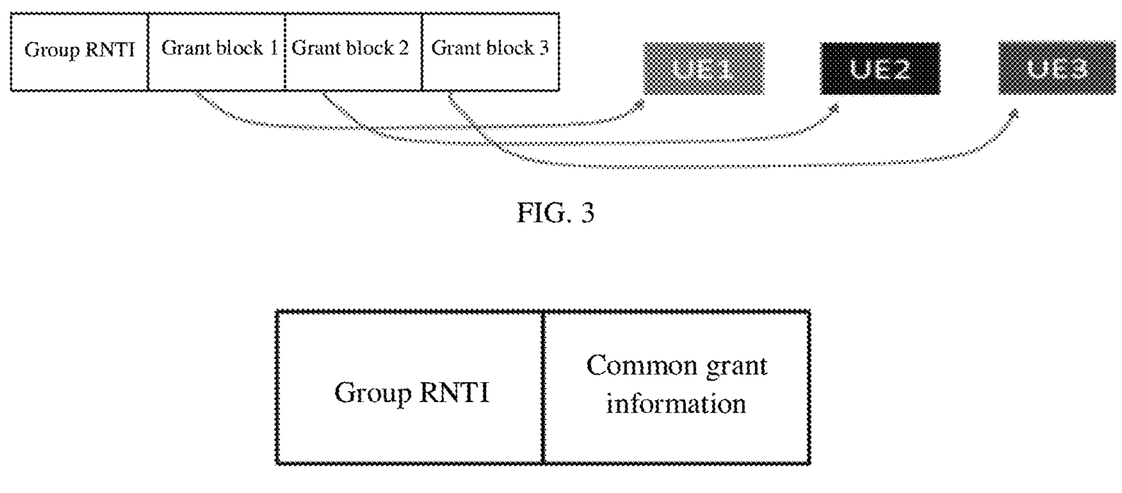
FIG. 3
FIG. 4
| Group RNTI | Common information | Independent information 1 | Independent information 2 |
|---|---|---|---|
FIG. 5
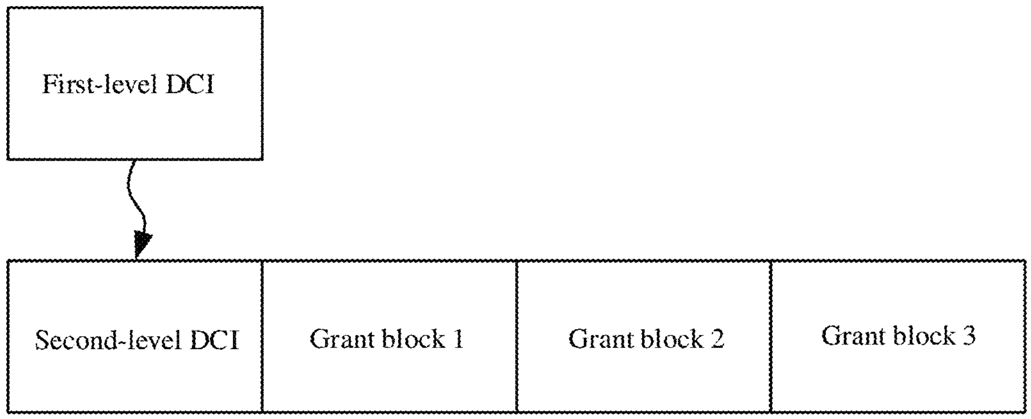
FIG. 6

GROUP-SCHEDULING INSTRUCTION PROCESSING METHOD AND APPARATUS, COMMUNICATION DEVICE, AND STORAGE MEDIUM

CROSS REFERENCE TO RELATED APPLICATIONS

This application is the US national phase application of International Application No. PCT/CN2021/105565, filed on Jul. 9, 2021, the entire contents of which are incorporated herein by reference.

TECHNICAL FIELD

The present disclosure relates to the field of wireless communication technologies, but is not limited to the field of wireless communication technologies, and in particular to methods and apparatuses for processing a group-scheduling instruction, a communication device and a storage medium.

BACKGROUND

Multimodality involves sources or forms of multiple pieces of information, for example, people have senses of touch, hearing, sight and smell; and media of information include voice, video and words and the like. In order to perceive inputs of a user from multiple dimensions, there may be a large number of types of application programs and/or apparatuses for multimodal information acquisition, which include multiple cameras, loudspeaker boxes, sensors, keyboards and fingerprint readers and the like. These apparatuses for collecting multimodal information may be used on a same device or across device. At a server end, it is required to perform data fusion of multimodal datasets, or information fusion, namely, synthesis and data analysis processing is performed on incomplete information provided by multiple sensors or information sources about a particular environmental feature to form a relative complete and consistent perception description, so as to achieve more accurate recognition and determination functions. The process in which the server completes data fusion and makes decision to obtain a multimodal output is a service distribution process. Usually, services are not distributed to individual devices but it is highly possible to achieve linkage of multiple relevant devices. For example, it is determined by vocal print and video that the owner is coming back, and thus curtains are closed and air conditioners are turned on at the same time. Further, a problem that group collaboration is to be performed among multiple output devices is also involved here.

SUMMARY

One or more embodiments of the present disclosure provide methods and apparatuses for processing a group-scheduling instruction, a communication device and a storage medium.

According to a first aspect of embodiments of the present disclosure, there is provided a method for processing a group-scheduling instruction, which is performed by a network device. The method includes: sending a group-scheduling instruction for a user equipment (UE) group, where the UE group includes one or more UEs.

According to a second aspect of embodiments of the present disclosure, there is provided a method for processing a group-scheduling instruction, which is performed by a user equipment (UE). The method includes: receiving a group-scheduling instruction for a UE group, where the UE group includes one or more UEs.

According to a third aspect of embodiments of the present disclosure, there is provided a communication device, including a processor, a transceiver, and a memory storing computer programs executable by the processor, where the processor is configured to, when executing the computer programs, perform the method for processing a group-scheduling instruction as mentioned in the first or second aspect.

It will be understood that the above general descriptions and subsequent detailed descriptions are merely illustrative and explanatory rather than limiting of the present disclosure.

BRIEF DESCRIPTION OF THE DRAWINGS

The drawings incorporated into the specification to constitute a part of the specification illustrate embodiments consistent with the present disclosure and interpret the principle of the embodiments of the present disclosure together with the specification.

FIG. 3 is a schematic diagram illustrating first-type downlink control information (DCI) according to an exemplary embodiment of the present disclosure.

FIG. 4 is a schematic diagram illustrating second-type DCI according to an exemplary embodiment of the present disclosure.

FIG. 5 is a schematic diagram illustrating third-type DCI according to an exemplary embodiment of the present disclosure.

FIG. 6 is a schematic diagram illustrating third-type DCI according to another exemplary embodiment of the present disclosure.

DETAILED DESCRIPTION OF THE EMBODIMENTS

Figure 1:
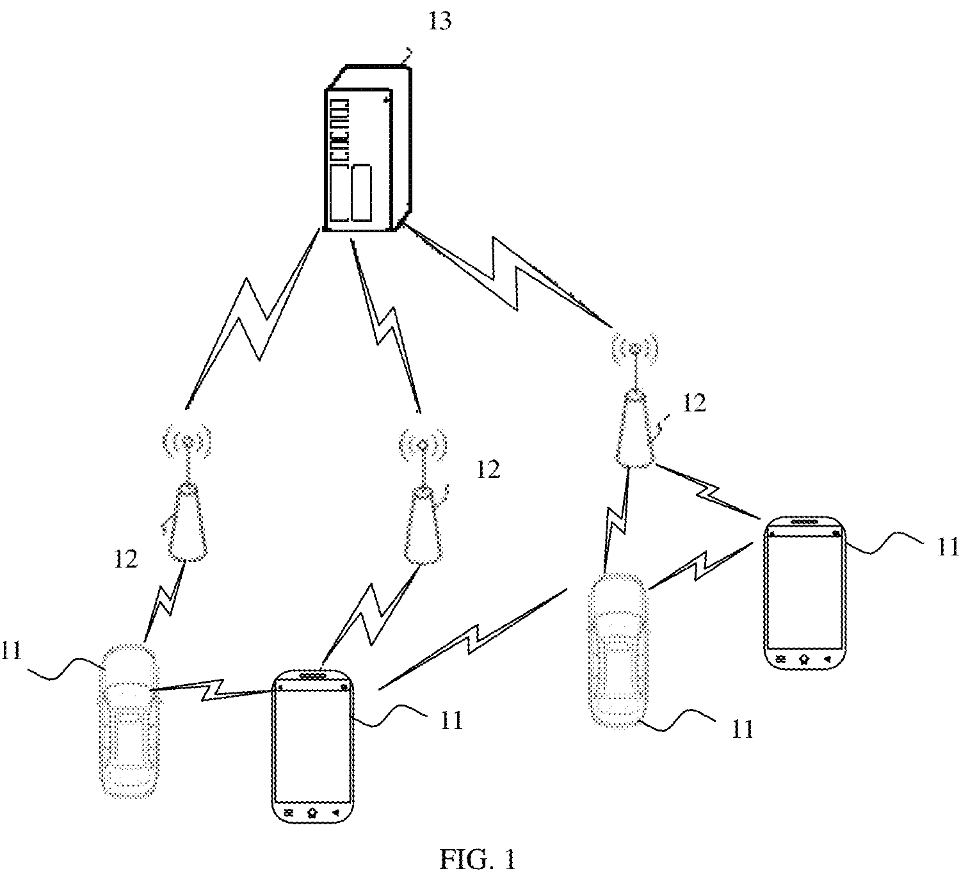
FIG. 1 is a structural schematic diagram illustrating a radio communication system according to an exemplary embodiment of the present disclosure.

Exemplary embodiments will be described in details herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are used for the purpose of describing particular embodiments only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any or all possible combinations of one or more of the associated listed items.

It is to be understood that, although the terms "first," "second," "third," and the like may be used in the embodiments of the present disclosure to describe various information, such information should not be limited to these terms. These terms are only configured to distinguish a category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

FIG. 1 is a structural schematic diagram illustrating a radio communication system according to an embodiment of the present disclosure. As shown in FIG. 1, the radio communication system is a communication system based on cellular mobile communication technology, and the radio communication system may include multiple UEs 11 and multiple access devices 12.

The UE 11 may be a device directed toward a user to provide voice and/or data connectivity. The UE 11 be a UE of internet of things, such as a sensor device, a mobile phone, (or called cellular phone), and a computer having a UE of internet of things, such as a fixed, portable, pocket-sized, handheld, or computer-inbuilt or vehicle-mounted apparatus, such as station (STA), subscriber unit, subscriber station, mobile station, mobile, remote station, access point, remote terminal, access terminal, user terminal, user agent, user device, or user equipment. In an embodiment, the UE 11 may also be a device of an unmanned aerial vehicle, or a vehicle-mounted device, for example, may be a trip computer having wireless communication function, or a wireless communication device externally connected to a trip computer. In an embodiment, the UE 11 may be a roadside device, for example, may be a road lamp, signal lamp or another roadside device having wireless communication function.

The access device 12 may be a network side device in a wireless communication system. The wireless communication system may be a fourth-generation mobile communication technology (4G) system, which is also called Long Term Evolution (LTE) system. In an embodiment, the wireless communication system may also be a 5G system, which is also called new radio (NR) system or 5G NR system. In an embodiment, the wireless communication system may also be a next generation system of the 5G system. An access network in the 5G system may be referred to as New Generation-Radio Access Network (NG-RAN); or it is an MTC system.

The access device 12 may be an evolved access device (eNB) employed in the 4G system. In an embodiment, the access device 12 may also be an access device adopting centralized distributed architecture (gNB) in the 5G system. When adopting the centralized distributed architecture, the access device 12 usually includes a central unit (CU) and at least two distributed units (DU). In the central unit, protocol stacks of a Packet Data Convergence Protocol (PDCP) layer, a Radio Link Control (RLC) layer and a Media Access Control (MAC) layer are disposed: in the distributed unit, a physical (PHY) layer protocol stack is disposed. The specific implementations of the access device 12 are not limited in the embodiments of the present disclosure.

Wireless connection may be established between the access device 12 and the UE 11 through a wireless air interface. In different implementations, the wireless air interface is a wireless air interface based on the fourth generation mobile communication network technology (4G) standard: or, the wireless air interface is a wireless air interface based on the fifth generation mobile communication network technology (5G) standard, for example, the wireless air interface is a new air interface: or, the wireless air interface may also be a wireless air interface based on a next generation mobile communication network technology standard of 5G.

In some embodiments, end to end (E2E) connection may also be established between the UEs11, for example, in the scenarios of vehicle to vehicle (V2V) communication, vehicle to Infrastructure (V2I) communication, and vehicle to pedestrian (V2P) communication and the like in vehicle to everything (V2X) communication.

In some embodiments, the above wireless communication system may also include a network management device 13.

A plurality of access devices 12 are connected to the network management device 13 respectively. The network management device 13 may be a core network device in the wireless communication system, for example, the network management device 13 may be a Mobility Management Entity (MME) in an Evolved Packet Core (EPC). Alternatively, the network management device may also be another core network device, such as Serving GateWay (SGW), Public Data Network GateWay (PGW), Policy and Charging Rules Function (PCRF), or Home Subscriber Server (HSS) or the like. The implementation morphology of the network management device 13 is not limited in the embodiments of the present disclosure.

Figure 2:
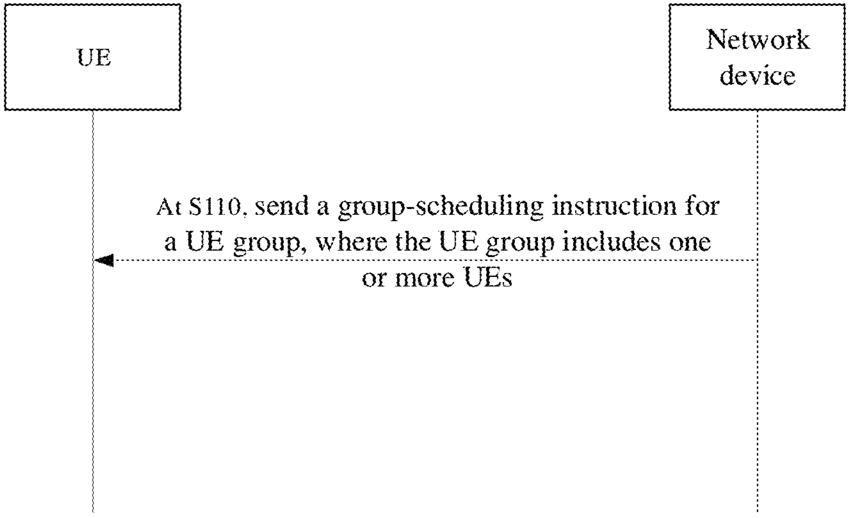
FIG. 2 is a flowchart illustrating a method for processing a group-scheduling instruction according to an exemplary embodiment of the present disclosure.

As shown in FIG. 2, an embodiment of the present disclosure provides a method for processing a group-scheduling instruction, which is performed by a network device. The method includes the following step S110.

At step S110, a group-scheduling instruction for a user equipment (UE) group is sent, where the UE group includes one or more UEs.

The network device includes, but is not limited to, an access device such as a base station.

Illustratively, the network device may send a group-scheduling instruction for a UE group, where the group-scheduling instruction is used for a UE group. This newly-introduced group-scheduling instruction can perform scheduling for a specific UE group, bringing high scheduling flexibility.

In an embodiment of the present disclosure, multiple UEs in the UE group are UEs having service relevance or similarity, or the UEs in the UE group have frequent data interactions. Therefore, joint scheduling may be performed on the UEs in the UE group by a group-scheduling instruction. In this case, on the one hand, scheduling optimization such as scheduling synchronism can be realized, and, on the other hand, in a case of using a group-scheduling instruction, if the UEs in the UE group are granted, the scheduling of other UEs can be known.

Illustratively, the UE group includes one or more multimodal output UEs, or one or more federated learning UEs.

For example, in some cases, an image device outputs images, an audio device outputs audio, and a camera device collects images. These devices have service relevance. These devices are all connected to a network and thus are UEs of the network. These devices can thus be called multimodal output UEs and can be assigned into a UE group.

In some embodiments, the federated learning UEs are multiple UEs for federated training of a machine learning model. The UE group where the federated learning UEs are located may be referred to as a federated learning UE group. There may be a huge number of data interactions among the multiple UEs in the federated learning UE group. At this time, resource scheduling may be performed on the UEs in the federated learning UE group by using a group-scheduling instruction and thus the UEs desiring communication can communicate well based on a scheduling instruction.

In some embodiments, the group-scheduling instruction is downlink control information (DCI) of a group type physical downlink control channel (PDCCH). The DCI of the group type PDCCH is downlink control information transmitted by the physical downlink control channel (PDCCH) for the UE group.

In the embodiments of the present disclosure, the above group-scheduling instruction may be a physical-layer scheduling instruction, and the physical-layer DCI has the characteristics of high scheduling dynamism and small delay.

In some embodiments, the UE group has a group radio network temporary identity (RNTI), where the group RNTI is configured at least to scramble the DCI of the group type PDCCH.

In the embodiments of the present disclosure, a group RNTI is configured for a UE group, where the group RNTI is used for the entire UE group and known by all UEs in the UE group.

The group RNTI herein is different from an RNTI of an individual UE. If a UE is located in a UE group, the UE may have a group RNTI as well as an RNTI by which it communicates with a network device.

In some embodiments, the group RNTI includes at least one of the followings:

- a downlink group RNTI configured to scramble a downlink transmission of the UE group;
- an uplink group RNTI configured to scramble an uplink transmission of the UE group: or
- an uplink-downlink general group RNTI configured to scramble the uplink transmission and the downlink transmission of the UE group.

For example, for a multimodal output UE group, since the UEs in the multimodal output UE group are mostly used for output while receiving data mostly from a network side, a downlink group RNTI may be separately disposed for the UE group, where the downlink group RNTI may be used at the network side to scramble the downlink transmission of these UEs.

The downlink group RNTI may be specially configured to scramble the downlink transmission.

The downlink transmission herein includes, but is not limited to, a downlink instruction and/or downlink data. The downlink instruction includes, but is not limited to, a downlink scheduling instruction. The downlink scheduling instruction herein may include, but be not limited to, the above group-scheduling instruction.

Some UE groups may involve synchronous upload. For example, multiple camera devices collect different videos in a same collection scenario and these videos may be spliced into a stereoscopic video or used for synchronous live broadcast and the like. The UE group formed by the camera devices may involve a large amount of data to be synchronized or transmitted in an associated manner. For the UE groups formed by such UEs, more uplink resource requests and more service data are uploaded. Thus, an uplink group RNTI for the uplink transmission of the UE groups may be disposed. The uplink group RNTI may be specially used for the RNTI of downlink transmission.

Since some UE groups may have both uplink transmission and downlink transmission, these UE groups may be configured with an uplink group RNTI and a downlink group RNTI at the same time. Of course, in another embodiment, the group RNTI configured for the UE groups may be uplink-downlink general group RNTI which can be used for both the scrambling of the downlink transmission and the scrambling of the uplink transmission.

In some embodiments, the DCI of the group type PDCCH includes at least one of first-type DCI, second-type DCI, and third-type DCI.

The first-type DCI has different independent grant information for different UEs in the UE group.

The second-type DCI has common grant information for all of the UEs in the UE group, and the common grant information is used for resource scheduling for the UEs in the UE group.

The third-type DCI has common information for at least part of the UEs in the UE group and independent information for a UE in the UE group.

The first-type DCI may include one or more grant blocks, and one or more grants may be formed by one or more bits. Different grant blocks correspond to different bits.

Illustratively, FIG. 3 is a structural diagram of the first-type DCI. As shown in FIG. 3, a grant block 1 may be used for a UE 1 in the UE group, a grant block 2 may be used for a UE 2 in the UE group, and a grant block 3 may be used for a UE 3 in the UE group.

For different UEs in a same UE group, the first-type DCI may adopt different grant blocks for scheduling.

The grant blocks may be used for UE resource scheduling and/or transmission parameter configuration. The transmission parameter configuration includes, but is not limited to, configuration of modulation and coding scheme (MCS).

In some embodiments, the UEs in the UE group have a group number and the like. Thus, when scheduling is performed on the UE group by using the first-type DCI, a UE may, based on a correspondence between a ranking number of the grant blocks in the first-type DCI and a group number, determine which grant block is used for scheduling on itself. In view of this, the n-th grant block in the first-type DCI can be used for scheduling on the UE with the group number n in the UE group. Due to use of this correspondence, the bit overhead of the first-type DCI is small and the UE decoding is simple.

In another embodiment, the first-type DCI may entirely use the group RNTI for scrambling and use the RNTIs of individual UEs for scrambling for different grant blocks. In this case, when receiving the first-type DCI, the UE may firstly use the group RNTI for descrambling and then use its own RNTI for descrambling. Successfully-scrambling grant blocks are scheduling on themselves. Thus, the ranking of the grant blocks of the first-type DCI can be performed flexibly.

As shown in FIG. 3, in an implementation scenario of the first-type DCI, in order to further save signaling overhead, a part of common parameters in each grant block may share a common part. For example, when the UEs in a UE group are geographically close to each other and the channel states differ little, common MCS levels may be shared to save signaling overhead.

In an embodiment, the first-type DCI configures different grant blocks for different UEs, and thus can perform UE scheduling with the highest flexibility.

The common grant information carried in the second-type DCI is used for the scheduling of all UEs, for example, the common grant information is configured to schedule a resource pool available to the entire UE group. When it is required to determine which UE in the UE group uses which resource, the determination can be based on a resource-allocation-related grant rule between the UEs in the UE group.

Illustratively, the second-type DCI schedules a segment of resource. After receiving the second-type DCI, the UE knows the resource pool corresponding to the entire UE group, and then based on the resource equal-division policy and its own group number in the UE group, divides the resource equally into the same number of parts as the number of the UEs in the UE group, and then based on its own group number M, selects the M-th part of resource as a resource for being scheduled. Of course, this is only an example, and the specific implementation is not limited to this example.

FIG. 4 is a schematic diagram of a second-type DCI.

In some embodiments, the common grant information included in the second-type DCI includes is configured to determine resource scheduling for a UE based on a grant rule.

The grant rule can be determined between the UE and the network device in the following several optional ways.

The grant rule includes a pre-negotiated grant rule or a protocol-agreed grant rule, where the grant rule is configured to determine the resource allocation of the UEs in the UE group.

For example, the network device and any one UE in the UE group or a master UE in the UE group negotiate a grant rule and finally notify the grant rule to each of the UEs. In this case, in subsequent scheduling, resource allocation can be performed based directly on the pre-negotiated grant rule.

For another example, the grant rule may also be agreed by a protocol. This protocol may be a communication standard protocol or a private protocol jointly observed by several manufacturers. In conclusion, in some embodiments, the grant rule may be written into the protocol.

If the grant rule is written into the protocol, the network device and the UE both will pre-write it and thus the UE and the network device can know it without information interaction.

Certainly, there may be multiple sets of protocol-agreed grant rules and the specific contents of the rules are limited by the protocol. Which protocol-defined grant rule will be used will be negotiated between the network device and the UE before the network device performs resource scheduling. Illustratively, the base station can directly distribute an identifier of a corresponding grant rule to the UE, and the UE can, after receiving the identifier, know the grant rule indicated by the network device for resource allocation between the UEs.

The second-type DCI carries the common grant information and thus the bit overhead of the DCI can be minimized.

In some embodiments, the group DCI may also include a third-type DCI different from the above first-type DCI and/or second-type DCI. Illustratively, the third-type DCI can, to some extent, be understood as a mixture of the first-type DCI and the second-type DCI.

For example, the third-type DCI may include a common part and an independent part. The common part may be configured to carry the common information, and the independent part may be used as the independent information of an individual UE.

FIG. 5 is a schematic diagram illustrating a third-type DCI. In FIG. 5, it shows common information and two pieces of independent information which are independent information 1 and independent information 2 respectively. The independent information 1 and the independent information 2 can be used for different UEs in the UE group.

In some embodiments, in order to ensure successful transmission of the common part, the common part carrying the common information can be disposed in a middle part of the bits contained in the third-type DCI and the independent information is disposed in an edge part of the bits contained in the third-type DCI.

The common information may be information for at least two UEs in the UE group and the independent information may be information for an individual UE in the UE group.

In an embodiment, the common information may be information for all of the UEs in the entire UE group.

In another embodiment, the common information may be information for some UEs in the UE group. For example, it is assumed that all UEs in the UE group adopt a same MCS. At this time, the indication of the MCS can be implemented by the common information. For another example, different UEs in the UE group have different resources and the independent information indicates a different resource of each of the UEs.

For another example, the frequency domain resources scheduled for all UEs in the UE group are same but the time domain resources are different. Thus, in consideration of bit overhead, a resource identifier of the frequency domain resource may be carried in the common information and the indication information of the time domain positions of different UEs is carried in the independent information.

In short, in the embodiments of the present disclosure, the third-type DCI has a part carrying the common information and a part carrying the independent information at the same time. On the one hand, the bit overhead can be reduced by the part corresponding to the common information while flexible scheduling can be achieved by the part of the independent information. Thus, a good balance can be achieved between the bit overhead and the flexible scheduling.

In an embodiment, the third-type DCI includes first-level DCI and at least one piece of second-level DCI.

At this time, an association relationship between the first-level DCI and the second-level DCI may include the followings:

the first-level DCI indicates the common information; the second-level DCI indicates the independent information; and/or, the first-level DCI is a piece of scheduling DCI of the second-level DCI, namely, the first-level DCI is further configured to schedule the second-level DCI.

If the first-level DCI is configured to schedule the second-level DCI, whether to schedule the second-level DCI may be determined based on whether there is independent information for a UE in the UE group currently. If there is independent information for a UE in the UE group, it is carried by the second-level DCI. At this time, the first-level DCI will schedule the second-level DCI. After the UE in the UE receives the first-level DCI, the UE receives the second-level DCI on a corresponding resource based on the scheduling information of the second-level DCI carried in the first-level DCI. If there is no independent information for an individual UE in the UE group currently, the scheduling of the UE group is achieved by only using the first-level DCI in the third-type DCI.

In an embodiment, the bit number included in the first-level DCI may be a fixed number, and some bits in the first-level DCI are configured to schedule the second-level DCI.

In another embodiment, the bit number of the second-level DCI is variable, and the bit number included in the second-level DCI may be determined based on the bit overhead of the independent information, or based on the number of the UEs to receive the independent information. Usually, the larger the bit overhead of the independent information, the more the bits included in the second-level DCI and/or, the larger the number of the UEs to receive the independent information, and thus the larger the number of the grant blocks carried by the second-level DCI, and thus the larger the bit number of the corresponding second-level DCI.

Of course, the above is only exemplary description for the first-level DCI and the second-level DCI and the specific implementation is not limited to the above example.

In some embodiments, the third-type DCI has a first-level DCI and a second-level DCI in the format of DCI. But, in specific implementation, whether the third-type DCI distributes the second-level DCI is to be determined based on whether there is independent information for a UE in the UE group currently. As shown in FIG. 6, the third-type DCI may be divided into two levels.

If there is no scheduling relationship between the first-level DCI and the second-level DCI or there is a scheduling relationship but the first-level DCI and the second-level DCI are transmitted simultaneously on continuous communication resources, different levels of DCI may be provided with distinct delimiters or the like. For example, there is a separator between the first-level DCI and the second-level DCI, where the separator is formed by a preset sequence.

Of course, in some embodiments, the first-level DCI and the second-level DCI may use different scrambling sequences for scrambling. Thus, after receiving them, the UE may, based on different scrambling sequences, know which is the first-level DCI and which is the second-level DCI. Illustratively, the first-level DCI may use the group RNTI for scrambling and the second-level DCI may use the RNTI of the scheduled UE itself for scrambling. For another example, a UE group may have multiple group RNTIs and at this time, the first-level DCI and the second-level DCI may use different group RNTIs for scrambling. In this case, without setting a delimiter, the UE can separate the first-level DCI from the second-level DCI upon receiving the third-type DCI.

Of course, in some cases, the position and/or length of the first-level DCI may be relatively fixed. Thus, after receiving the third-type DCI, the UE may, based on the configuration of the position and/or length of the first-level DCI, firstly determine the first-level DCI, and other backups are all regarded as the second-level DCI.

FIG. 6 is DCI of a group type PDCCH including the first-level DCI and the second-level DCI at the same time. The second-level DCI may include different grant blocks, and different blocks may be used for different UEs in the UE group.

The above are descriptions of the third-type DCI and the specific implementation is not limited to the above descriptions.

Figure 7:
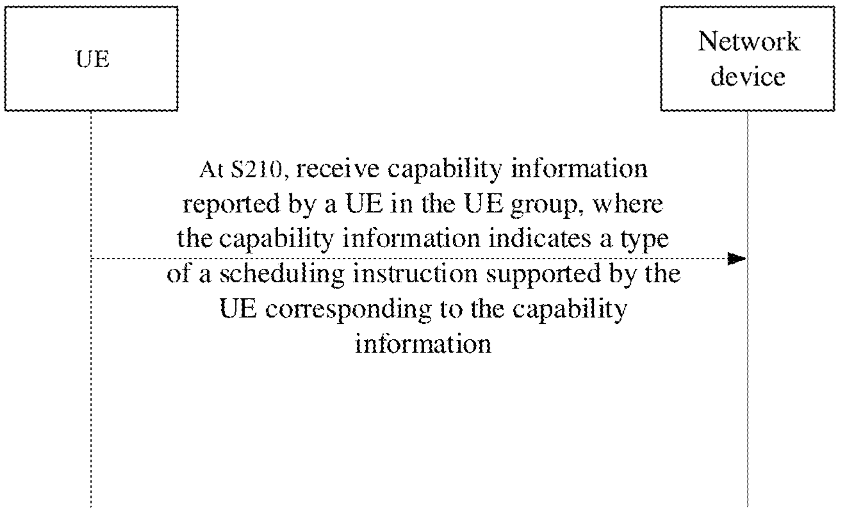
FIG. 7 is a flowchart illustrating a method for processing a group-scheduling instruction according to another exemplary embodiment of the present disclosure.

As shown in FIG. 7, an embodiment of the present disclosure provides a method. The method includes the following step S210.

At step S210, capability information reported by a UE is received, where the capability information indicates a type of a scheduling instruction supported by the UE corresponding to the capability information.

The step S210 of receiving the capability information can be performed separately or in combination with the preceding step S110 and the like.

If the steps S210 and S110 are performed in combination, the step S210 may be firstly performed to determine whether all UEs in the corresponding UE group support a group-scheduling instruction based on the received capability information. Thus, it can be determined to send the group-scheduling instruction for the UE group.

If it is determined that there is any UE not supporting the group-scheduling instruction in the UE group, it can be determined not to send the group-scheduling instruction to the UE group. Certainly, if most of the UEs in the UE group support the group-scheduling instruction, the group-scheduling instruction can be still used for the major part of the UE group and separate scheduling is performed on those UEs not supporting the group-scheduling instruction. In this way, the signaling overhead and the scheduling times can be still reduced.

The type of the scheduling instruction herein includes at least one of: a group-scheduling instruction for the UE group; a scheduling instruction for an individual UE; or a scheduling instruction for all UEs in a cell.

The scheduling instruction for all UEs in the cell usually is a broadcast instruction.

In an embodiment, the capability information may be configured to indicate whether the UE supports the group-scheduling instruction.

If the UE supports the group-scheduling instruction, the UE at least can receive and decode the corresponding group-scheduling instruction.

In an embodiment, all UEs in a UE group are equal, namely, all UEs in the UE group are not in the state of managing or being managed and representing or being represented and the like.

In some other cases, if the UE group includes two types of UEs, which are first-type UEs and second-type UEs respectively. For example, the first-type UEs are managing UEs and the second-type UEs are ordinary UEs. The managing UEs may manage or represent the second-type UEs to perform transmission and reception of the information about the UE group communication with the network side. Certainly, the above is only an example.

Thus, the network side receives the capability information reported by the UEs and can determine whether the corresponding UEs support the group-scheduling instruction, or which types of scheduling instructions are supported by the corresponding UEs.

In some embodiments, the capability information indicates at least one of the followings:

whether the UE supports decoding the group-scheduling instruction;

a type of the scheduling instruction for which the UE supports decoding, where the type of the scheduling instruction includes: a group-scheduling instruction for the UE group and/or a separate scheduling instruction for an individual UE.

Figure 8:
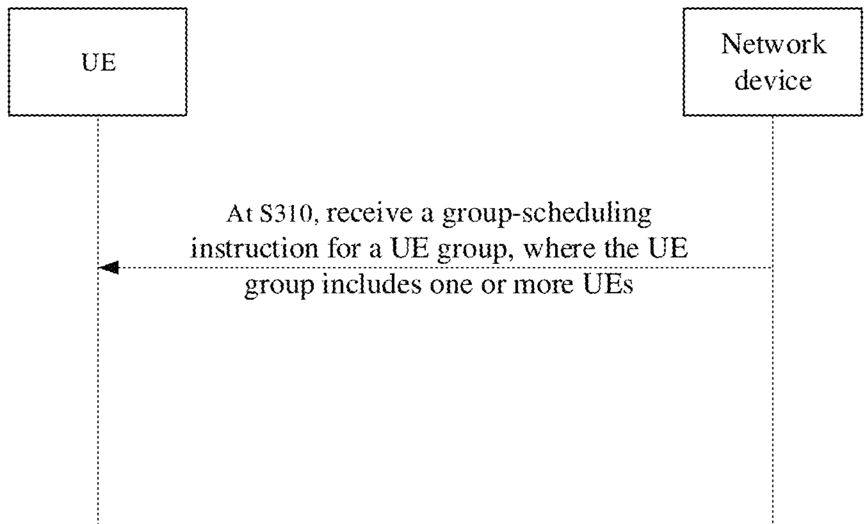
FIG. 8 is a flowchart illustrating a method for processing a group-scheduling instruction according to yet another exemplary embodiment of the present disclosure.

As shown in FIG. 8, an embodiment of the present disclosure provides a method for processing a group-scheduling instruction, which is executed by a UE. The method includes the following step S310.

At step S310, a group-scheduling instruction for a UE group is received, where the UE group includes one or more UEs.

The UE may be any type of UE, for example, the UE may be a wearable device, such as a mobile phone, a tablet computer, a smart watch or smart glasses or the like, a vehicle-mounted device, a smart household device or a smart office device or the like.

The above are only examples for the UE.

In an embodiment of the present disclosure, the UE may be a terminal device joining the UE group.

The UE may receive the group-scheduling instruction for the UE group. In an embodiment of the present disclosure, the group-scheduling instruction for the UE group may include a scheduling instruction for multiple UEs in the UE group.

In an embodiment of the present disclosure, the scheduling instruction is a group-scheduling instruction and has the characteristics of small signaling overhead and high scheduling efficiency.

In some embodiments, the UE group has a group radio network temporary identity (RNTI). The method further includes: based on the group RNTI, descrambling the group-scheduling instruction.

The group RNTI herein may be an RNTI pre-allocated by the network side to the UE group, for example, an RNTI allocated when the network side establishes the UE group, or an RNTI for the UE group after the UE group is established. The RNTI is an RNTI for the UE group, and therefore, the RNTI is called group RNTI. The group RNTI may be distributed by a Radio Resource Control (RRC) layer message such as an RRC signaling. Certainly, the message for distributing the group RNTI is only exemplified and the specific implementation is not limited hereto. For example, the RNTI may also be received based on Media Access Control Control Element (MAC CE) distributed by the base station side.

In an embodiment, the group MAC CE may include at least one of:

a downlink group RNTI, configured to scramble a downlink transmission of the UE group;

an uplink group RNTI, configured to scramble an uplink transmission of the UE group;

an uplink-downlink general group RNTI, configured to scramble the uplink transmission and the downlink transmission of the UE group.

In an embodiment of the present disclosure, a UE group may have one or more group RNTIs. The group RNTIs may be divided based on the functionality of the group RNTIs as follows:

a downlink group RNTI, configured to scramble the downlink transmission;

an uplink group RNTI, configured to scramble the uplink transmission;

an uplink-downlink group RNTI, configured to scramble the uplink transmission and the downlink transmission.

When the UEs in the UE group use a group RNTI for scrambling and/or descrambling, a corresponding group RNTI may be used for scrambling and descrambling based on a transmission direction to be scrambled and/or descrambled. The transmission direction herein may at least include: an uplink transmission direction from the UE to the network side and/or a downlink transmission direction from the network side to the UE.

In some embodiments, the group-scheduling instruction includes DCI of a group type PDCCH.

In an embodiment of the present disclosure, the group-scheduling instruction is a piece of DCI transmitted by the PDCCH. Further, the group-scheduling instruction is used for the UE group. Therefore, the DCI of the PDCCH is referred to as DCI of a group type PDCCH. The DCI has the characteristics of high dynamism and small delay.

In some embodiments, the DCI of the group type PDCCH includes at least one of first-type DCI, second-type DCI, and third-type DCI.

The first-type DCI has different independent grant information for different UEs in the UE group.

The second-type DCI has common grant information for all of the UEs in the UE group, and the common grant information is used for resource scheduling for the UEs in the UE group.

The third-type DCI has common information for at least part of the UEs in the UE group and independent information for a UE in the UE group.

The specific descriptions of the three types of DCI can be referred to the corresponding descriptions of the preceding embodiments and will not be repeated herein.

In some embodiments, the first-type DCI include grant blocks, where different grant blocks are in correspondence with different UEs in the UE group.

Different grant blocks are in correspondence with different UEs in the UE group so as to achieve independent scheduling of a grant block of an individual UE.

The second-type DCI directly carries common grant information, which includes, but is not limited to, at least one of: resource scheduling information for the UE group; or indication information of a grant rule for performing resource allocation among different UEs in the UE group.

Of course, the above are only exemplary descriptions of the common grant information carried by the second-type DCI and the specific implementation is not limited hereto.

In some embodiments, the common grant information included in the second-type DCI includes a pre-negotiated grant rule or a protocol-agreed grant rule, where the grant rule is configured to determine resource allocation of the UEs in the UE group.

In an embodiment of the present disclosure, the grant rule may be agreed by protocol or pre-negotiated between the UE group and the network side device, where the pre-negotiation may occur when the UE group is established or after the UE group is established.

In some embodiments, common information included in the third-type DCI is configured to indicate a parameter shared by at least a part of UEs in the UE group; independent grant information included in the third-type DCI is configured to indicate a difference grant parameter in the UE group.

In some embodiments, the shared parameter includes a modulation and coding scheme (MCS); and/or the difference grant parameter includes a resource scheduling parameter for different UEs in the UE group.

In some other embodiments, the common information may be common information of the resource scheduling for the UE group. The common information indicates a frequency domain resource and/or time domain resource configured to schedule resource for each of the UEs in the UE group, and the difference grant parameter indicates a different time domain resource used by a different UE using a same frequency domain resource, or indicates a different frequency domain resource used by a different UE using a same time domain resource.

In some embodiments, the third-type DCI includes first-level DCI and at least one piece of second-level DCI: where the first-level DCI indicates the common information: the second-level DCI indicates the independent information.

Illustratively, the first-level DCI may directly carry the common information and the second-level DCI may also directly carry the independent information. In some other embodiments, the first-level DCI and the second-level DCI both can realize indication of the common information and the independent information based on information carried by themselves and a correspondence between common information and independent information.

Figure 9:
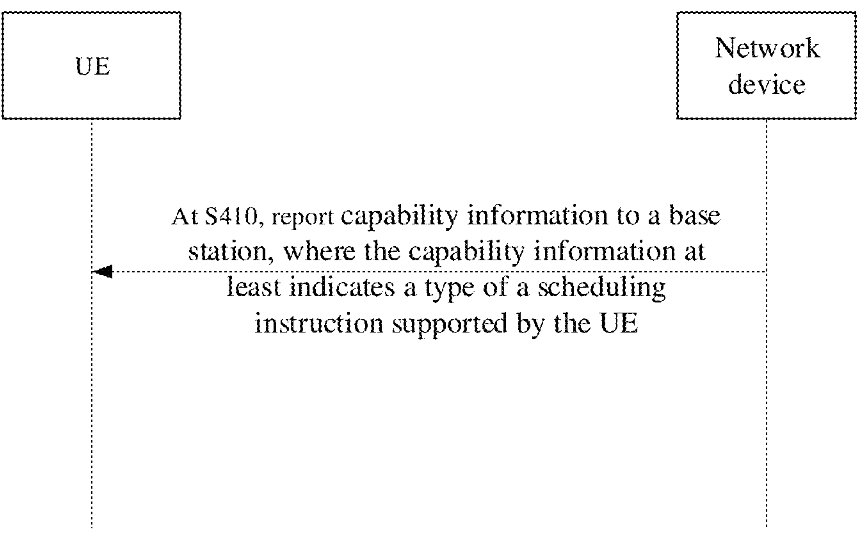
FIG. 9 is a flowchart illustrating a method for processing a group-scheduling instruction according to still another exemplary embodiment of the present disclosure.

As shown in FIG. 9, an embodiment of the present disclosure provides a method which is executed by a UE. The method includes the following step S410.

At step S410, capability information is reported to a base station, where the capability information at least indicates a type of a scheduling instruction supported by the UE. The capability information may at least indicate whether the UE supports a group-scheduling instruction, for example, the support of the UE for the group-scheduling instruction means the UE can receive the group-scheduling instruction.

The group-scheduling instruction herein may be the group-scheduling instruction mentioned in the preceding embodiments. In an embodiment of the present disclosure, in an application scenario where grouping synchronization is required in a network, a scheduling collaboration processing is added.

As an embodiment, UEs requiring grouping synchronization are multimodal output UEs.

As an embodiment, UEs requiring grouping synchronization are federated learning UEs.

In an embodiment, the network may perform scheduling grouping for the UEs based on the following solution to obtain a UE group.

As an embodiment, the scheduling grouping for the UEs may be performed based on service to obtain a UE group.

As an embodiment, the scheduling grouping for the UEs may be performed based on geographical location to obtain a UE group.

Illustratively, the base station obtains grouping information of the UEs from a core network and performs scheduling grouping on the UEs to obtain a UE group.

The core network may directly carry a group identifier (group ID) of a UE group to which the UEs belong.

Illustratively, the base station obtains the information for performing collaborative scheduling on multiple UEs from the core network and thus assigns the UEs into a UE group. For example, the core network indicates to the base station a Quality of Service (QOS) requirement with minimum limitation on arrival time between data flows of multiple UEs. In order to satisfy the QoS requirement, the base station needs to perform collaborative scheduling or synchronous scheduling with UE group as granularity on these UEs.

In an embodiment, the network, based on the provided group-scheduling instruction, i.e. the DCI of the group type PDCCH, performs grouping scheduling on the UEs of the UE group, which specifically includes: introducing a group RNTI for group-scheduling; where the group RNTI is notified in advance by the network to the UEs by a common signaling or special signaling.

Illustratively, the group RNTI for group-scheduling may be configured to schedule an uplink and/or downlink direction.

In an embodiment, the network device may distribute a group RNTI1 of the uplink direction and a group RNTI2 of the downlink direction at the same time.

In an embodiment, the network device may only distribute the group RNTI1 of the uplink direction.

In an embodiment, the network device may only distribute the group RNTI2 of the downlink direction.

For the group-scheduling instruction, a DCI of a group type PDCCH for group-scheduling is introduced, where the group RNTI is configured to scramble the DCI of the group type PDCCH, and the DCI of the group type PDCCH may have the following formats.

First Manner: As Shown in FIG. 3, the DCI Carries Separate Grant Information.

As an embodiment:

Case A: no common information is extracted from the DCI of the group type PDCCH;

where the network may notify each of the UEs of the position of the grant information (grant block) of the UE in the DCI of the group type PDCCH, and thus the UE can find the grant information corresponding to itself for interpretation.

At this time, the grant information of each of the UEs can be taken as a grant block.

For example, the grant block 1, the grant block 2 and the grant block 3 respectively label the grant of the UE1, UE2 and UE3.

The UE performs reception on the corresponding resource based on respective grant information.

In order to further save the signaling overhead, the DCI shown in FIGS. 4 to 6 may be used.

Case B: common information is extracted.

The common information of each grant block may be set aside and placed in a common part. For example, the grouped UEs are usually close to each other, and thus the channel state differs little, for example, there is a common MCS level to be shared so as to save the signaling overhead.

For example, in the grant, there exists a common grant block (block 0) labeling a part of common information granted by all UEs and closely followed by the block1, block 2 and block 3 respectively labeling the independent information of the UE 1, UE 2 and UE 3.

Second Manner: The DCI Carries a Piece of Common Grant Information Shared Among the UEs Based on a Predefined or Network-Notified Rule, for Example, as Shown in FIG. 4.

The predefined rule includes: an index of the UEs in the group, for example, 0, 1, 2 . . . .

How to allocate resources: for example, the frequency domain equal resource is divided into three parts, and the UEs numbered 0, 1, and 2 use a first part of frequency domain resource, a second part of frequency domain resource and a third part of frequency domain resource.

For example, the frequency domain resource is divided into three parts, and the UEs numbered 0, 1, and 2 use a first part of frequency domain resource, a second part of frequency domain resource and a third part of frequency domain resource, where the start and end points of the use are notified to the network in the DCI.

Third manner: the combination of the above two manners is used, namely, the DCI carries a piece of common grant information to be shared by some UEs or carries separate grant information for some UEs. The separate grant information herein is the independent information mentioned in the above embodiments. The information shared by the UEs herein is the above common information.

For example, in the grant, there are two parts, a first part of which uses the manner 1 to indicate the resource grant of the UE 1 and UE 2, and a second part uses the manner 2 to indicate the resource grant of the UE 3 and UE 4.

For the first part, the DCI corresponding to the first manner indicates the grant of the UE 1 and UE 2 and it is also possible that there may be two manners.

For example, block 1 and block 2 respectively label the resource grant the UE 1 and UE 2.

Alternatively, the common grant block (block 0) labels the common part parameter granted by the UE 1 and UE 2 and immediately next to it are block1 and block 2 respectively labeling other grant resource parts of the UE 1 and UE 2.

For the second part, the DCI corresponding to the second manner indicates the grant of the UE 3 and UE 4, namely, carries a piece of common grant information, which is shared by the UE 3 and UE 4 based on the predefined or network-notified rule.

The DCI corresponding to the third manner may be as shown in FIG. 5 or 6.

In some embodiments, DCI of a group type PDCCH including two levels of DCI is introduced by referring to FIG. 6.

The first-level DCI may introduce a second-level scheduling DCI in format.

As an embodiment, the first-level DCI may carry the common information of the grouping scheduling.

As an embodiment, the first-level DCI may carry the scheduling information of the second-level scheduling DCI, where the second-level DCI may schedule multiple grants.

In some embodiments, there is a scheduling relationship between the first-level DCI and the second-level DCI, namely, the second-level DCI is scheduled by the first-level DCI. Furthermore, the first-level DCI may also carry several pieces of common information of some UEs in the UE group; the second-level DCI may indicate the independent information of each of the UEs different from the common information.

In some embodiments, the UEs will report to the network whether there is a capability to perform group-scheduling.

The UE capability is introduced, namely, whether decoding the DCI of the group type PDCCH is supported, that is, whether the function of the group-scheduling is supported.

The UE capability is introduced, namely, whether decoding the DCI of the group type PDCCH and DCI of another scheduling PDCCH is supported at the same time.

The UEs report its current UE capability information to the network.

Figure 10:
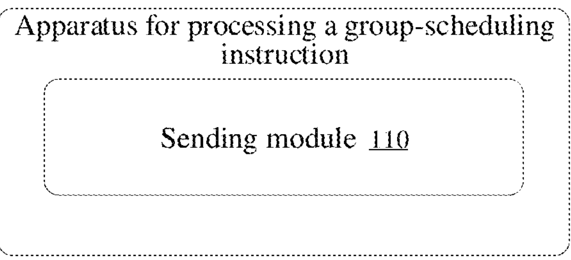
FIG. 10 is a structural schematic diagram illustrating an apparatus for processing a group-scheduling instruction according to an exemplary embodiment of the present disclosure.

As shown in FIG. 10, an embodiment of the present disclosure provides an apparatus for processing a group-scheduling instruction. The apparatus includes a sending module 110.

The sending module 110 is configured to send a group-scheduling instruction to a user equipment (UE) group, where the UE group includes one or more UEs.

In some embodiments, the sending module 110 may include a program module and the program module is executed by a processor to send a group-scheduling instruction for the UE group.

In some other embodiments, the sending module 110 may be a software-hardware combination module; the software-hardware combination module includes, but is not limited to, various programmable arrays; the programmable arrays include, but are not limited to, a field programmable array and/or complex programmable array.

In some other embodiments, the sending module 110 may also include, but be not limited to: a pure hardware module; and the pure hardware module includes, but is not limited to, an application-specific integrated circuit.

In some embodiments, the UE group includes one or more multimodal output UEs, or one or more federated learning UEs.

In some embodiments, the group-scheduling instruction includes downlink control information (DCI) of a group type physical downlink control channel (PDCCH), where the DCI of the group type PDCCH is downlink control information transmitted by a physical downlink control channel for the UE group.

In some embodiments, the UE group has a group radio network temporary identity (RNTI), where the group RNTI is configured at least to scramble the DCI of the group type PDCCH.

In some embodiments, the group RNTI includes at least one of:

- a downlink group RNTI configured to scramble a downlink transmission of the UE group;
- an uplink group RNTI configured to scramble an uplink transmission of the UE group: or
- an uplink-downlink general group RNTI configured to scramble the uplink transmission and the downlink transmission of the UE group.

In some embodiments, the DCI of the group type PDCCH includes at least one of first-type DCI, second-type DCI.

The first-type DCI has different independent grant information for different UEs in the UE group.

The second-type DCI has common grant information for all of the UEs in the UE group, and the common grant information is used for resource scheduling for the UEs in the UE group.

The third-type DCI has common information for at least part of the UEs in the UE group and independent information for a UE in the UE group.

In some embodiments, the first-type DCI includes grant blocks; and different grant blocks are in correspondence with different UEs in the UE group.

In some embodiments, the common grant information included in the second-type DCI is configured to determine resource scheduling for an individual UE based on a grant rule. The grant rule includes: a pre-negotiated grant rule or a protocol-agreed grant rule, where the grant rule is configured to determine resource allocation for the UEs in the UE group.

In some embodiments, the third-type DCI includes first-level DCI and at least one piece of second-level DCI, where the first-level DCI indicates the common information: the second-level DCI indicates the independent information.

In some embodiments, the apparatus may further include a receiving module.

The receiving module is configured to receive capability information reported by the UEs, where the capability information indicates a type of a scheduling instruction supported by a corresponding UE.

In some embodiments, the capability information indicates at least one of the followings:

- whether the UE supports decoding the group-scheduling instruction;
- a type of the scheduling instruction for which the UE supports decoding, where the type of the scheduling instruction includes: a group-scheduling instruction for the UE group and/or a separate scheduling instruction for an individual UE.

Figure 11:
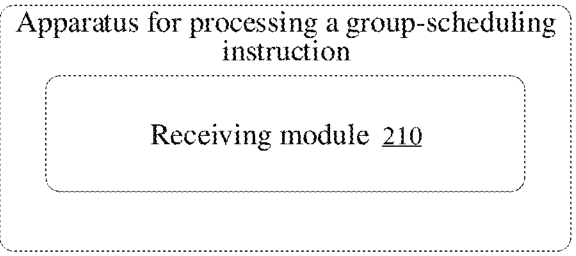
FIG. 11 is a structural schematic diagram illustrating an apparatus for processing a group-scheduling instruction according to another exemplary embodiment of the present disclosure.

As shown in FIG. 11, an embodiment of the present disclosure provides an apparatus for processing a group-scheduling instruction. The apparatus includes a receiving module 210.

The receiving module 210, configured to receive a group-scheduling instruction for a user equipment (UE) group, where the UE group includes one or more UEs.

In an embodiment, the receiving module 210 may be a program module, and the program module is executed by a processor to receive the group-scheduling instruction.

In another embodiment, the receiving module 210 may be a software-hardware combination module; the software-hardware combination module includes, but is not limited to, various programmable arrays. The programmable arrays include, but are not limited to: a field programmable array and/or complex programmable array.

In an embodiment, the UE group has a group radio network temporary identity (RNTI), and the apparatus further includes a descrambling module.

The descrambling module is configured to descramble the group-scheduling instruction based on the group RNTI.

In an embodiment, the group RNTI includes at least one of:

a downlink group RNTI configured to scramble a downlink transmission of the UE group;

an uplink group RNTI configured to scramble an uplink transmission of the UE group;

an uplink-downlink general group RNTI configured to scramble the uplink transmission and the downlink transmission of the UE group.

In an embodiment, the group-scheduling instruction includes DCI of a group type PDCCH. The DCI of the group type PDCCH includes at least one of first-type DCI, second-type DCI, or third-type DCI.

The first-type DCI has different independent grant information for different UEs in the UE group.

The second-type DCI has common grant information for all of the UEs in the UE group, and the common grant information is used for resource scheduling for the UEs in the UE group.

The third-type DCI has common information for at least part of the UEs in the UE group and independent information for a UE in the UE group.

In an embodiment, the first-type DCI includes grant blocks; and different grant blocks are in correspondence with different UEs in the UE group.

In an embodiment, the common grant information included in the second-type DCI includes: a pre-negotiated grant rule or a protocol-agreed grant rule, where the grant rule is configured to determine resource allocation for the UEs in the UE group.

In an embodiment, the third-type DCI includes first-level DCI and at least one piece of second-level DCI, where the first-level DCI indicates the common information; the second-level DCI indicates the independent information; and/or, the first-level DCI is further configured to schedule the second-level DCI.

An embodiment of the present disclosure provides a communication device, including: a processor; and a memory storing computer programs executable by the processor, where the processor is configured to, when executing the computer programs, perform any method mentioned in the above technical solutions.

The processor may include any type of storage medium, which is a non-transitory computer storage medium and can continue memorizing and storing information thereon after the communication device is powered off.

The communication device herein includes an access device or a UE or a core network device.

The processor can be connected with the memory via a bus or the like to read an executable program stored on the memory, for example, at least one of the methods shown in FIGS. 2, and 6 to 9.

Figure 12:
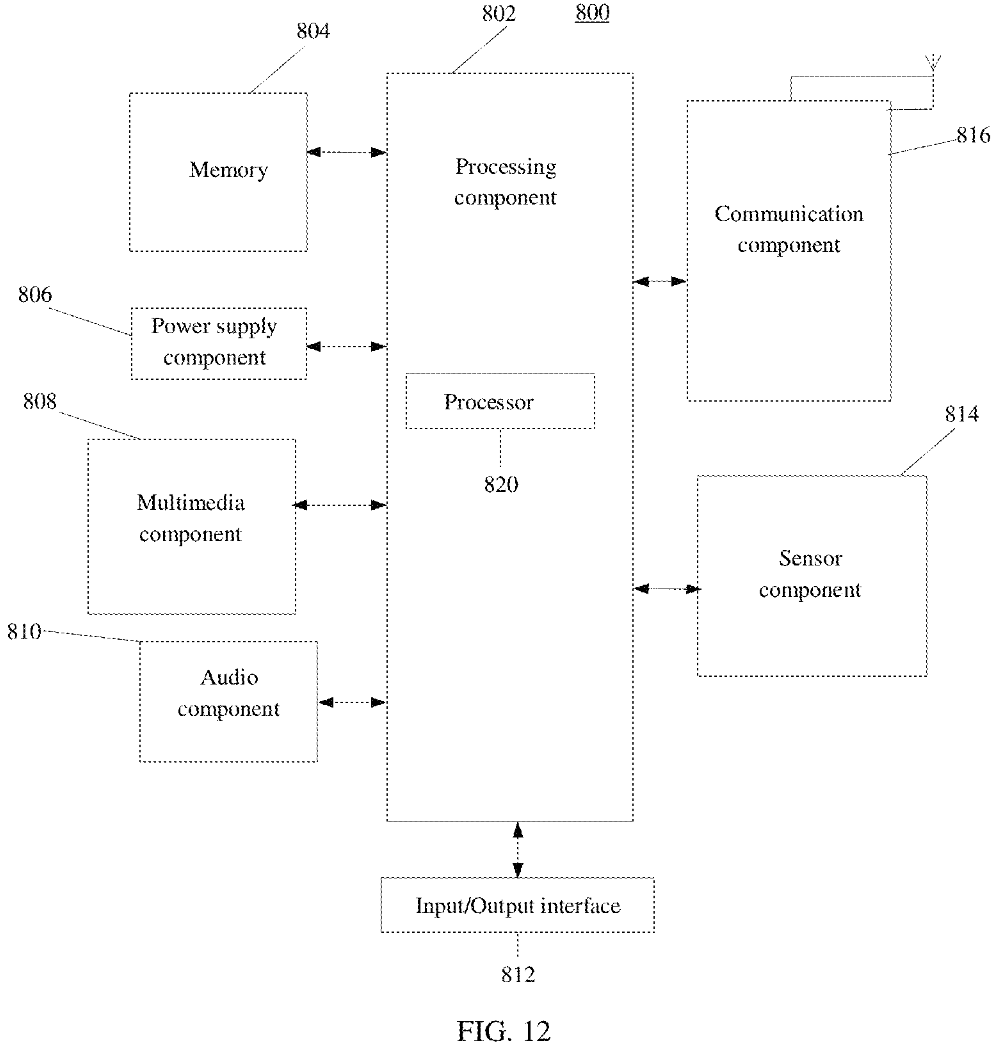
FIG. 12 is a structural schematic diagram illustrating a UE according to an exemplary embodiment of the present disclosure.

FIG. 12 is a block diagram of a UE 800 according to an exemplary embodiment of the present disclosure. For example, the UE 800 may be a mobile phone, a computer, a digital broadcast user device, a message transceiver, a game console, a tablet device, a medical device, a fitness device, a personal digital assistant, and the like.

As shown in FIG. 12, the UE 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls overall operations of the UE800, such as operations associated with display, phone calls, data communications, camera operations, and recording operations. The processing component 802 may include one or more processors 820 to execute instructions to complete all or part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE800. Examples of such data include instructions for any application program or method operated on the UE800, contact data, phonebook data, messages, pictures, videos, and so on. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 806 supplies power for different components of the UE800. The power supply component 806 may include a power supply management system, one or more power supplies, and other components associated with generating, managing and distributing power for the UE800.

The multimedia component 808 includes a screen that provides an output interface between the UE800 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 808 includes a front camera and/or a rear camera. When the UE800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 810 is configured to output and/or input audio signals. For example, the audio component 810 includes a microphone (MIC) configured to receive an external audio signal when the UE800 is in an operation mode, such as a call mode, a recording mode, and a voice recognition mode. The received audio signal may be further stored in the memory 804 or transmitted via the communication component 816. In some examples, the audio component 810 also includes a loudspeaker for outputting an audio signal.

The I/O interface 812 provides an interface between the processing component 802 and a peripheral interface module which may be a keyboard, a click wheel, a button, or the like. These buttons may include, but are not limited to a home button, a volume button, a start button, and a lock button.

The sensor component 814 includes one or more sensors for providing a status assessment in various aspects to the UE800. For example, the sensor component 814 may detect an open/closed state of the UE800, and the relative positioning of the component, for example, the component is a display and a keypad of the UE800. The sensor component 814 may also detect a change in position of the UE800 or a component of the UE800, the presence or absence of a user in contact with the UE800, the orientation or acceleration/deceleration of the UE800 and a change in temperature of the UE800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the UE800 and other devices. The UE800 may access a wireless network based on a communication standard, such as WiFi, 2G or 3G, or a combination thereof. In an example, the communication component 816 receives broadcast signals or broadcast associated information from an external broadcast management system via a broadcast channel. In an example, the communication component 816 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the UE800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

In an exemplary embodiment, there is also provided a non-transitory computer readable storage medium including instructions, such as a memory 804 including instructions, where the instructions are executable by the processor 820 of the UE800 to perform the method as described above. For example, the non-transitory computer readable storage medium may be a Read Only Memory (ROM), a Random Access Memory (RAM), a CD-ROM, a magnetic tape, a floppy disk and an optical data storage device and the like.

Figure 13:
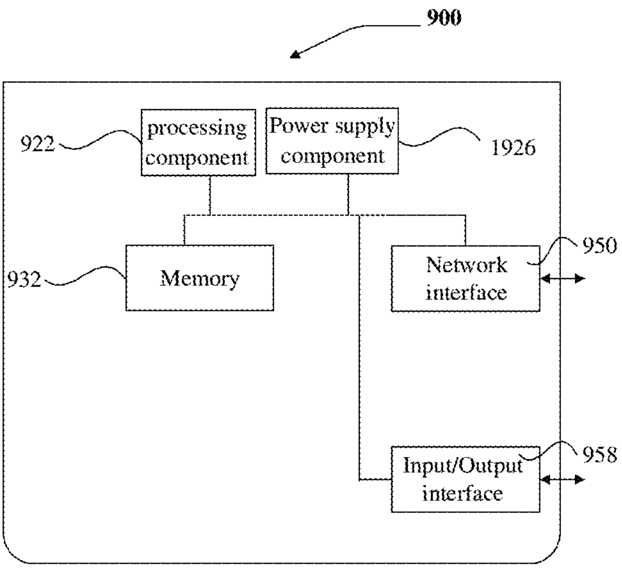
FIG. 13 is a structural schematic diagram illustrating a communication device according to an exemplary embodiment of the present disclosure.

As shown in FIG. 13, an embodiment of the present disclosure provides a structure of an access device. For example, the communication device 900 may be provided as a network side device. The communication device may be the above access device and/or core network device.

As shown in FIG. 13, the communication device 900 may include a processing component 922 which further includes one or more processors and memory resources represented by memory 932 for storing instructions executable by the processing component 922, for example, an application program. The application program stored in the memory 932 may include one or more modules, each of which corresponds to one set of instructions. Further, the processing component 922 is configured to execute instructions to perform the above methods, for example, the methods shown in FIGS. 2, and 6 to 9.

The communication device 900 further includes a power supply component 926 configured to execute power management for the communication device 900, one wired or wireless network interface 950 configured to connect the electronic device 900 to a network, and one input/output (I/O) interface 958. The communication device 900 may be operated based on an operating system stored in the memory 932, such as Windows Server™, Mac OS X™, Unix™, Linux™, FreeBSD™ or the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method for processing a group-scheduling instruction, performed by a network device, and comprising:

sending a group-scheduling instruction for a user equipment (UE) group, wherein the UE group comprises one or more UEs;

wherein the group-scheduling instruction comprises downlink control information (DCI) of a group type physical downlink control channel (PDCCH), wherein the DCI of the group type PDCCH is downlink control information transmitted by a physical downlink control channel for the UE group;

wherein the DCI of the group type PDCCH comprises at least one of first-type DCI, second-type DCI, or third-type DCI, wherein the first-type DCI has different independent grant information for different UEs in the UE group;

the second-type DCI has common grant information for all of the UEs in the UE group, and the common grant information is used for resource scheduling for the UEs in the UE group; and the third-type DCI has common information for at least part of the UEs in the UE group and independent information for a UE in the UE group;

wherein the common grant information comprised in the second-type DCI is configured to determine resource scheduling for a UE in the UE group based on a grant rule, and the grant rule comprises a pre-negotiated grant rule or a protocol-agreed grant rule, wherein the grant rule is configured to determine resource allocation for the UEs in the UE group.

2. The method of claim 1, wherein the UE group comprises one or more multimodal output UEs, or one or more federated learning UEs.

3. The method of claim 1, wherein the UE group has a group radio network temporary identity (RNTI), wherein the group RNTI is configured at least to scramble the DCI of the group type PDCCH.

4. The method of claim 3, wherein the group RNTI comprises at least one of:

a downlink group RNTI configured to scramble a downlink transmission of the UE group;

an uplink group RNTI configured to scramble an uplink transmission of the UE group; or an uplink-downlink general group RNTI configured to scramble the uplink transmission and the downlink transmission of the UE group.

5. The method of claim 1, wherein the first-type DCI comprises grant blocks, and the grant blocks correspond to the UEs in the UE group, respectively.

6. The method of claim 1, wherein the third-type DCI comprises first-level DCI and at least one piece of second-level DCI, wherein the first-level DCI indicates the common information;

the second-level DCI indicates the independent information; and/or the first-level DCI is further configured to schedule the second-level DCI.

7. The method of claim 1, further comprising:

receiving capability information reported by a UE in the UE group, wherein the capability information indicates a type of a scheduling instruction supported by the UE corresponding to the capability information.

8. The method of claim 7, wherein the capability information indicates at least one of:

whether the UE supports decoding the group-scheduling instruction; or a type of the scheduling instruction for which the UE supports decoding, wherein the type of the scheduling instruction comprises at least one of a group-scheduling instruction for the UE group, or a separate scheduling instruction for a UE.

9. A method for processing a group-scheduling instruction, performed by a user equipment (UE), and comprising:

receiving a group-scheduling instruction for a UE group, wherein the UE group comprises one or more UEs;

wherein the group-scheduling instruction comprises downlink control information (DCI) of a group type physical downlink control channel (PDCCH);

wherein the DCI of the group type PDCCH comprises at least one of first-type DCI, second-type DCI, or third-type DCI, wherein the first-type DCI has different independent grant information for different UEs in the UE group;

the second-type DCI has common grant information for all of the UEs in the UE group, and the common grant information is used for resource scheduling for the UEs in the UE group; and the third-type DCI has common information for at least part of the UEs in the UE group and independent information for a UE in the UE group;

wherein the common grant information comprised in the second-type DCI is configured to determine resource scheduling for an individual UE in the UE group based on a grant rule, and the grant rule comprises a pre-negotiated grant rule or a protocol-agreed grant rule, wherein the grant rule is configured to determine resource allocation for the UEs in the UE group.

10. The method of claim 9, wherein the UE group has a group radio network temporary identity (RNTI), and the method further comprises:

descramble, based on the group RNTI, the group-scheduling instruction.

11. The method of claim 10, wherein the group RNTI comprises at least one of:

a downlink group RNTI configured to scramble a downlink transmission of the UE group;

an uplink group RNTI configured to scramble an uplink transmission of the UE group; or an uplink-downlink general group RNTI configured to scramble the uplink transmission and the downlink transmission of the UE group.

12. The method of claim 9, wherein the first-type DCI comprises grant blocks, and the grant blocks correspond to the UEs in the UE group, respectively.

13. The method of claim 9, wherein the third-type DCI comprises first-level DCI and at least one piece of second-level DCI, wherein the first-level DCI indicates the common information;

the second-level DCI indicates the independent information; and/or the first-level DCI is further configured to schedule the second-level DCI.

14. A communication device, comprising a processor;

a transceiver; and a memory storing computer programs executable by the processor, wherein the processor is configured to:

send a group-scheduling instruction for a user equipment (UE) group, wherein the UE group comprises one or more UEs;

wherein the group-scheduling instruction comprises downlink control information (DCI) of a group type physical downlink control channel (PDCCH), wherein the DCI of the group type PDCCH is downlink control information transmitted by a physical downlink control channel for the UE group;

wherein the DCI of the group type PDCCH comprises at least one of first-type DCI, second-type DCI, or third-type DCI, wherein the first-type DCI has different independent grant information for different UEs in the UE group;

the second-type DCI has common grant information for all of the UEs in the UE group, and the common grant information is used for resource scheduling for the UEs in the UE group; and the third-type DCI has common information for at least part of the UEs in the UE group and independent information for a UE in the UE group;

wherein the common grant information comprised in the second-type DCI is configured to determine resource scheduling for a UE in the UE group based on a grant rule, and the grant rule comprises a pre-negotiated grant rule or a protocol-agreed grant rule, wherein the grant rule is configured to determine resource allocation for the UEs in the UE group.

* * * * *